Nov. 19, 1929.  J. P. SPANG  1,736,138
MEAT TENDERING DEVICE
Filed Aug. 14, 1928
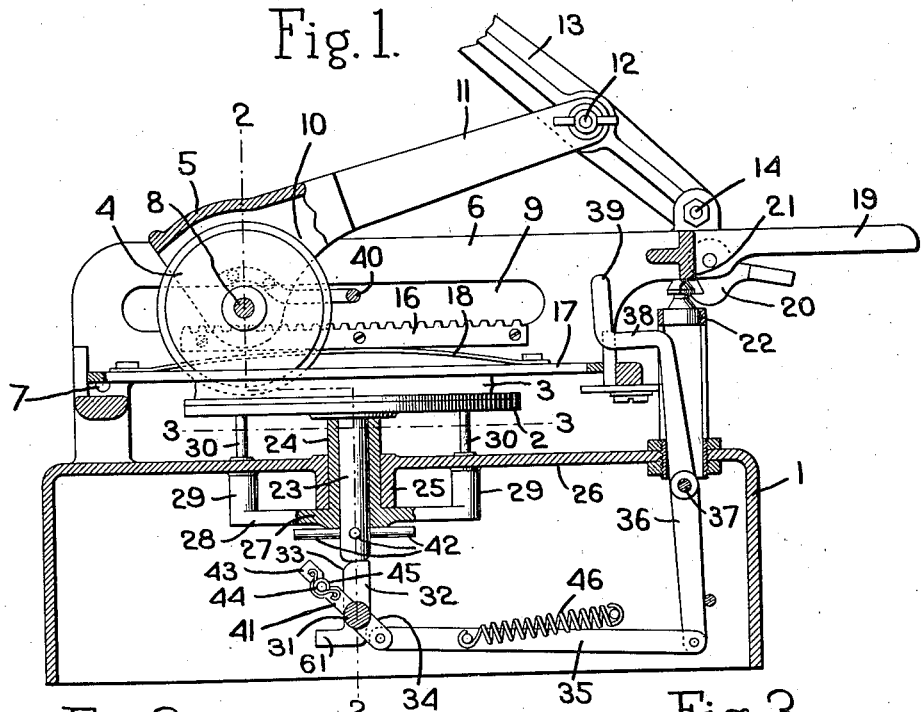
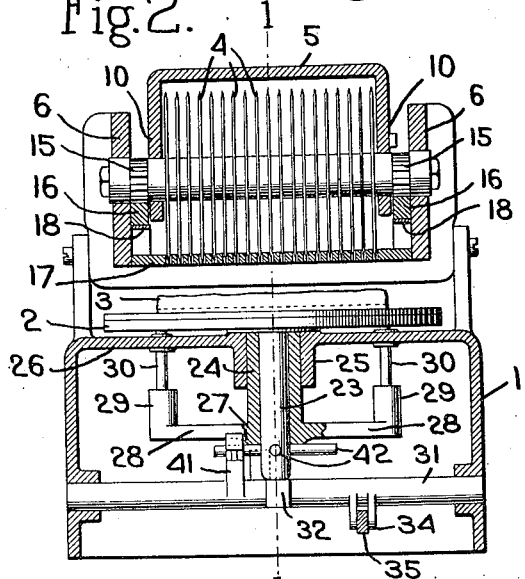
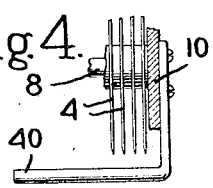
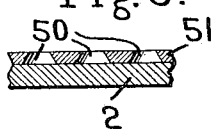
Inventor.
Joseph P. Spang
by Heard Smith & Tennant
Attys.

Patented Nov. 19, 1929

1,736,138

UNITED STATES PATENT OFFICE

JOSEPH P. SPANG, OF QUINCY, MASSACHUSETTS

MEAT-TENDERING DEVICE

Application filed August 14, 1928. Serial No. 299,532.

This invention relates to meat-tendering devices and particularly to a meat tenderer of the type shown in my Patent No. 1,649,-992, dated November 22nd, 1927. The device shown in this patent comprises a table on which the meat to be tendered is placed, and a reciprocating knife carriage movable over the table and carrying knives by which the meat on the table is slit as the carriage is moved back and forth.

An object of the present invention is to provide a meat tenderer of this type with means for automatically giving the table a turning movement at the end of the forward stroke of the knife carriage so that upon the return stroke the knives will cut slits in the meat which are at an angle to those formed on the forward stroke.

In order to give an understanding of the invention I have illustrated in the drawings a selected embodiment thereof which will now be described after which the novel features will be pointed out in the appended claims.

In the drawings Fig. 1 is a vertical sectional view of a meat tenderer such as shown in my above-mentioned Patent 1,649,992, said section being taken on substantially the line 1—1, Fig. 2;

Fig. 2 is a section on the line 2—2, Fig. 1;

Fig. 3 is a section on substantially the line 3—3, Fig. 1;

Fig. 4 is a fragmentary sectional view illustrating the bunter 40;

Fig. 5 is a detail of the turn-table turning means, and

Fig. 6 is a fragmentary sectional view of the turn-table.

The device herein illustrated comprises a frame 1 on which is mounted a bed or turn-table 2 adapted to support the meat 3 to be tendered. The tendering of the meat is accomplished in a manner similar to that illustrated in my above-mentioned Patent No. 1,649,992, that is by means of rotary knives 4 that are carried in a head 5 that is mounted for reciprocation in a knife carrier 6, the latter being in the form of a frame that is pivoted to the main frame 1 as shown at 7. The knives 4 are shown as fast on a shaft 8, the ends of which extend through slots 9 formed in the side walls of the knife carrier 6 and this shaft is also journalled in the cheek pieces 10 of the head 5. This head 5 is provided with a forward extension 11 which is pivotally mounted at 12 to a handle 13, the latter being pivoted at 14 to the knife carrier 6, all as illustrated in my above-mentioned patent. As the handle 13 is swung forwardly or to the right about its pivot 14 the head 5 will be drawn to the right thus causing the knives 4 to be passed over the piece of meat 3 supported on the table 2.

Means similar to that illustrated in my above-mentioned patent are provided for giving the knives 4 a positive rotation as the head 5 is moved back and forth and this is accomplished by providing the shaft 8 with pinions 15 which are fast thereon and which mesh with the teeth of racks 16 that are rigid with the side walls of the knife carrier 6.

The knife carrier supports a stripper plate 17 which is situated beneath the knives and is provided with slits through which the knives extend and which acts to clamp the meat against the bed during the slitting operation. This stripper is provided with the leaf springs 18 which engage the under side of the racks 16 and which yieldingly hold the stripper plate against the meat.

The knife carrier 6 is provided with a handle 19 by which it may be swung about its pivot 7 to permit the removal of the slit meat and the insertion of a fresh piece of meat. The handle 19 is provided with a latch 20 adapted to engage a shoulder 21 on the upper end of a post 22 which rises from the bed thereby to lock the knife carrier in its operative position.

The parts thus far described are similar to the corresponding parts illustrated and described in my prior Patent No. 1,649,992.

The turntable 2 is mounted in the bed for turning movement so that it can be turned at the end of each stroke of the head 5 thereby providing for cutting the slits in the meat in different directions and the principal object of the present invention is to provide novel means whereby this turning movement of the head will be automatically effected. In the present construction I have provided means whereby as the head approaches the end of its forward movement it will operate mechanism that will turn the turntable 2.

In order that the turntable may be freely turned it is necessary that it should be lowered away from the combined clamping and stripping member 17 so as to release the clamping pressure on the meat, and another feature of my invention relates to novel means for thus automatically lowering the turntable.

The turntable is provided with a stem or stud 23 which is journalled in a sleeve or bearing 24 that is carried by the frame 1. This sleeve or bearing 24 is mounted for vertical movement, it extending through and being movable vertically in a guiding boss 25 depending from the top plate 26 of the base 1. The bearing 24 is rigid with a spider member 27 which is provided with four arms 28, each arm having at its end a boss 29 from which rises a pin 30 that extends through an opening in the top plate 26 and bears against the under side of the turntable 2. These pins 30 thus constitute a support for the turntable which is vertically movable.

During the operation of slitting the meat the turntable will be in its elevated position shown in Fig. 1 in which position the upper surface thereof stands just below the edge of the knives so that when the head 5 moves toward the right the knives will slit the meat and cut it nearly through. Means are provided whereby when the head 5 reaches the right hand end of its stroke the turntable will be automatically lowered into a position shown in Fig. 2, in which the meat is separated from the combined clamping and stripping member 17, and at the same time the turntable with the meat thereon is given a turning movement about its axis 23, said table being then again raised into operative position so that when the head 5 is given its return movement the knives 4 will cut slits in the meat which are at an angle and across the slits which were cut during the forward stroke.

Journalled in the frame 1 beneath the stud 23 is a rock shaft 31. This shaft has fast thereon an arm 32 having a cam surface 33, said arm being situated directly beneath the stud 23. When the shaft and arm are in the position shown in Fig. 1 said arm stands vertically directly beneath the stud 23 and forms a support therefor. If the shaft 31 is turned clockwise Fig. 1 the arm 32 will be moved in the direction of the arrow and will be carried out from under the stud 23. When this occurs the weight of the table with the meat thereon will cause the latter to gravitate downwardly into the position shown in Fig. 2, the spider member 27 moving downwardly with it.

The shaft 31 is normally in the position shown in Fig. 1 and means are provided whereby at the end of the forward stroke of the head 5 said shaft will be turned into a position to withdraw the supporting arm 32 from operative engagement with the stud 23 thereby allowing the table to drop downwardly. Said shaft 31 has an arm 34 fast thereon which is connected by a link 35 to the lower end of a lever 36 pivoted to the frame at 37. Said lever is shown as extending up through the post 22, which is made hollow for this purpose, and the upper end of the lever is offset as shown at 38 and extends through a slot in the post, said offset end having an upwardly-extending portion 39.

The head 5 has a bunter 40 fast thereto which is situated in front of the knives 4 and is arranged so that it will engage the upstanding portion 39 of the lever 36 just before the head 5 reaches the end of its movement to the right. Consequently during the final movement of the head to the right the lever 36 will be turned and the lower end thereof will be moved to the left, Fig. 1, thereby turning the shaft 31 clockwise and withdrawing the supporting arm 32 from the stud 23. This operation allows the turntable to drop into the lowered position shown in Fig. 2. As this occurs the turntable is turned through a quarter of a revolution and this turning movement of the turntable is also accomplished through the turning movement of the shaft 31.

For this purpose the shaft 31 is provided with an arm or finger 41 which is adapted to engage one of a plurality of pins 42 extending laterally from the stud 23. Said stud 23 is herein shown as having four such pins extending therefrom and the arm 41 is located just one side of the stud 23 so that as the shaft 31 turns said arm 41 will engage one of the pins 42 and thereby give the shaft a turning movement. The turning movement thus given to the shaft 23 will be through approximately 90° which will bring another pin 42 into position to be acted on by the arm 41 during its next operation. Thus during the final movement of the head 5 to the right the turntable 2 will be lowered and will be given a turning movement through 90°.

In order to prevent the turntable from overrunning I have provided the stop arm 61 which is rigid with the shaft 31 and which is swung up into a position in the path of movement of the pins 42 by the above-mentioned clockwise rotative movement of the shaft 31, as shown in Fig. 5. Hence, while the arm 41 is cooperating with one pin 42 to give the turntable a quarter rotation, the stop arm 61 is being brought up into operative position to cooperate with another pin 42 to bring the turntable to rest at the proper point.

As soon as the the head 5 starts its return movement the turntable is again elevated into its operative position. To secure this I employ a return spring 46 which is secured at one end to the frame 4 and at the other end to the link 35. This spring is placed under tension when the lever 36 is actuated, and as soon as the carriage 5 begins to move to the left thereby relieving the pressure of the bunter 40 against the upstanding end 39 of said lever 36, the spring 46 will return the shaft 31 to its normal position shown in Fig. 1.

The swinging of the arm 32 from the position shown in Fig. 5 to that shown in Fig. 1 will operate through the action of the cam face 33 against the under side of the stud 23 to raise the latter and thereby restore the table 2 to its elevated position.

The arm 41 by which the turntable is given its turning movement is a jointed arm, it having the end section 43 which is connected to the body of the arm through the knuckle joint 44, the latter having a spring 45 associated therewith which tends to hold the section 43 in its straightened position. When, therefore, the shaft 31 is returned to its normal position and the arm 41 engages one of the pins 42, the knuckle joint will give to allow said arm to wipe under the pin and thus assume a position ready for the next operation.

In order to ensure that the meat 3 will adhere to the turntable 2 rather than to the combined stripper and clamping member 17 when the turntable is lowered I propose to provide the turntable with suction pockets which will develop more or less suction between the turntable and the meat.

These suction pockets are shown at 50. When the meat is pressed against the turntable it will be forced into the pockets somewhat, thus expelling the air and thus there will be more or less suction produced which will cause the meat to adhere to the turntable 2.

As shown in the drawings, these pockets have tapered walls and have a greater diameter at their lower ends than at their upper ends. They can conveniently be made in a plate 51 which is secured to the top of the turntable and which forms the upper surface thereof. The advantage of making the pockets larger at their lower end than at the upper end is that the meat which is crowded into the pockets becomes interlocked with the plate 51 and thus makes a firmer union.

While I have illustrated herein a selected embodiment of my invention, yet the invention is not limited to the constructional features shown.

I claim:—

1. In a meat-tendering machine, the combination with a frame, of a meat-supporting turntable mounted thereon, a knife carrier carried by the frame, a gang of knives supported thereby, means to move the knives back and forth across the table, and means actuated by the movement of the knife carrier to give the turntable a turning movement.

2. In a meat-tendering machine, the combination with a frame, of a rotatable meat-supporting turntable thereon, a reciprocating head carried by the frame, knives carried by the head, and turntable-rotating means actuated by the head as it approaches the end of its movement in one direction.

3. In a meat-tendering machine, the combination with a frame, of a rotatable meat-supporting table mounted for vertical movement, a reciprocating head, knives carried thereby adapted to slit the meat mounted on said table as the head reciprocates, and means actuated by the head as it approaches one end of its movement to lower the turntable and to give it a turning movement.

4. In a meat-tendering machine, the combination with a frame, of a rotatable meat-supporting table mounted for vertical movement, a reciprocating head, knives carried thereby adapted to slit the meat mounted on said table as the head reciprocates, means actuated by the head as it approaches one end of its movement to lower the turntable and to give it a turning movement, and a spring for returning the turntable to its elevated operative position.

5. In a meat-tendering machine, the combination with a frame, of a meat-supporting turntable mounted thereon, and a clamping member for clamping the meat against the turntable, said turntable and clamping member being movable toward and from each other, and the turntable having suction pockets which develop suction to cause the meat to adhere to the turntable rather than to the clamping member when the latter are separated.

6. In a meat-tendering machine, the combination with a frame, of a meat-supporting turntable rotatively mounted thereon, a clamping member for clamping the meat against the turntable, said clamping member and turntable being movable toward and from each other for clamping and unclamping the meat, the turntable having formed in its upper surface a plurality of suction pockets which are of larger diameter at their lower ends than at their upper ends whereby the clamping pressure on the meat will force it into the pockets thereby causing the meat to adhere to the turntable rather than to the clamping member when the two are separated.

In testimony whereof, I have signed my name to this specification.

JOSEPH P. SPANG.